Feb. 26, 1963   B. EDWARDS   3,079,027
DOUBLE WALLED NESTABLE PLASTIC CONTAINER
Filed Dec. 10, 1959   2 Sheets-Sheet 1
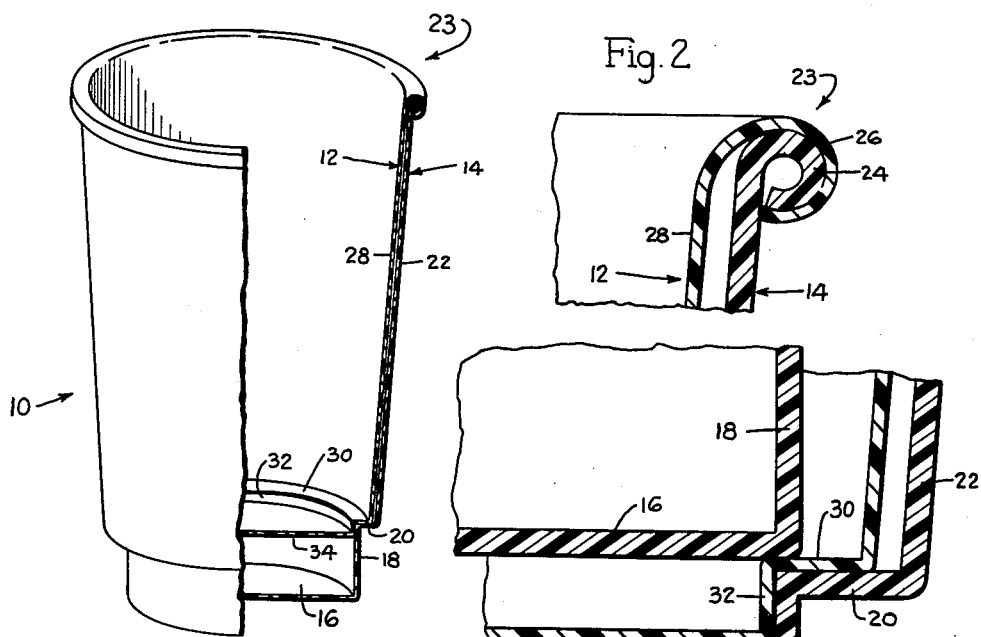
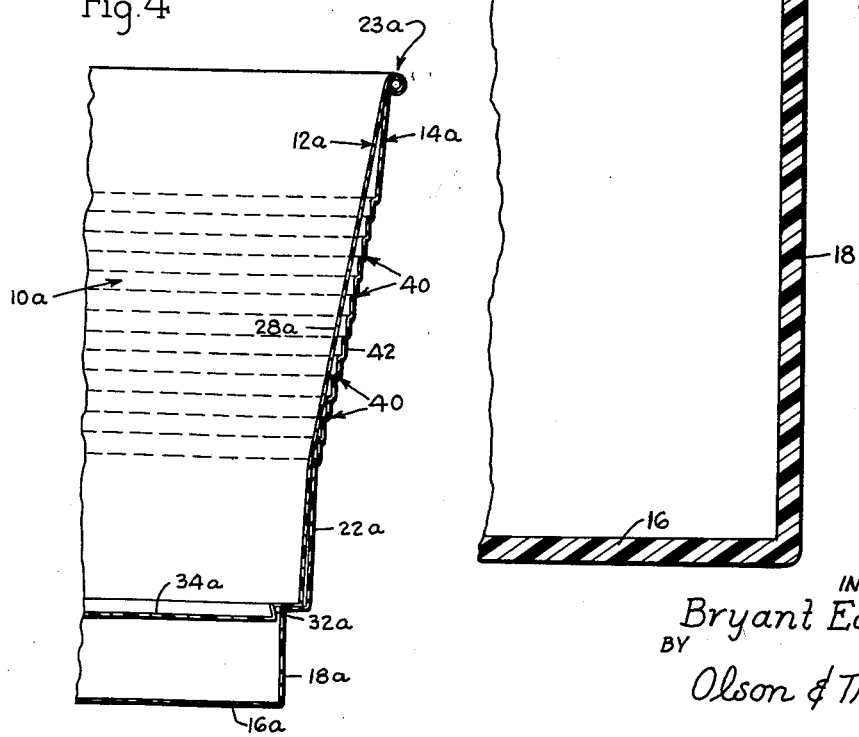
INVENTOR
Bryant Edwards
BY
Olson & Trexler
ATTY'S.

Feb. 26, 1963  B. EDWARDS  3,079,027
DOUBLE WALLED NESTABLE PLASTIC CONTAINER
Filed Dec. 10, 1959  2 Sheets-Sheet 2
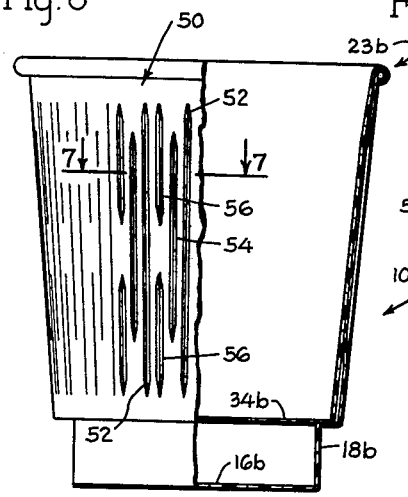
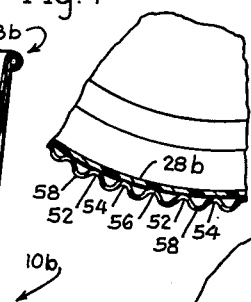
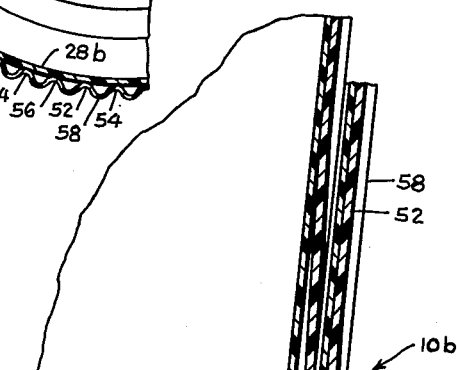
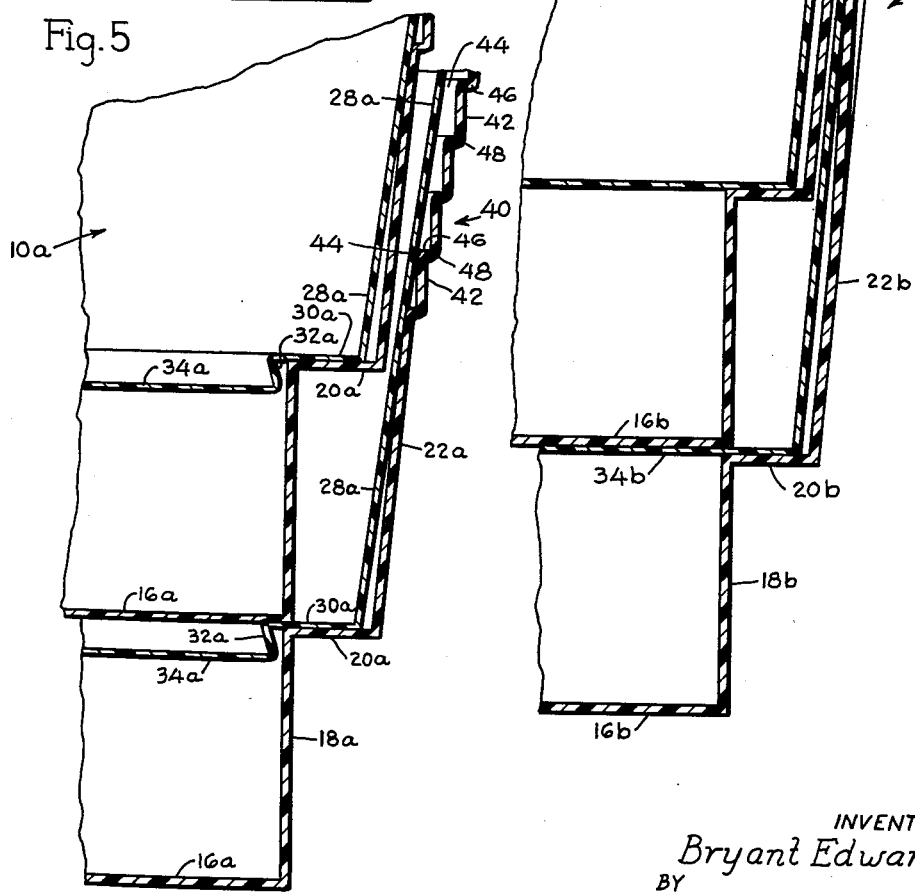
INVENTOR
Bryant Edwards
BY
Olson & Trexler
ATTY'S.

United States Patent Office 3,079,027
Patented Feb. 26, 1963

3,079,027
DOUBLE WALLED NESTABLE PLASTIC CONTAINER
Bryant Edwards, Oak Park, Ill., assignor to Illinois Tool Works Inc., a corporation of Delaware
Filed Dec. 10, 1959, Ser. No. 858,791
10 Claims. (Cl. 220—9)

This invention relates in general to containers and more particularly relates to plastic containers which are of the thin wall variety.

It has long been desired to have an economical plastic container for use with hot beverages, foods, etc., of the type wherein the user is not subjected to discomfort from the heat transfer of a hot beverage disposed within the container.

It is, therefore, a general object of this invention to provide a plastic container which, when filled with hot beverages, may be readily manually grasped without discomfort to the user while carrying or drinking from the container.

Another object of this invention is to provide an economical plastic container of the aforementioned type which may be stacked and readily dispensed from a vending machine, which has a false bottom and thereby eliminates stacking rings and is comparable in weight to present cup designs.

It is another object of this invention to provide a unitary plastic container which is unaffected by humidity and thus is dimensionally stable for easy vending, is uniform in size when manufactured by mass production techniques, and otherwise well adapted to be automatically vended from vending machines now in use.

It is a further object of this invention to provide a container as above described which is strong per unit weight, has no seams to disintegrate when filled with a hot beverage, and has insulating characteristics such that it may be readily held by a user when the temperature of the beverages contained therein are well above the temperature that the human hand can withstand.

It is a further object of this invention to provide a novel container as set forth above which protects table surfaces etc., from heat transfer and moisture vapor transmission from beverages contained therein.

Another object of the invention is to provide a double-walled container wherein a substantial portion of the inner wall of the container is spaced from the outer wall of the container to provide a heat insulating effect.

Another object of the invention is to provide a container formed of an inner and outer unit and is so constructed that in the event that the inner unit ruptures, the outer unit, which is peripherally continuous, will still retain the beverages disposed in the container.

It is a further object of this invention to provide an economical container of the so-called "throw-away" variety which is economically and easily manufactured by mass production techniques and comprises an assembly of two very thin wall container units, both container units being so constructed as to structurally interfit and reinforce each other whereby a high strength to weight ratio is obtained and a minimum of material is used.

It is a further object of this invention to provide a double container of the aforenoted general qualities which is esthetically pleasing and sanitary and is formed such that the inner container unit has a smooth interior which will not trap solid particles found in certain beverages such as coffee and may be readily cleaned, if desired, for reuse.

Another object of this invention is to provide, in certain forms thereof, a double container assembly as above described wherein the outer container unit is relatively thin and flexible and is formed with means thereon which prevent direct heat transfer through the thin wall dimensions of the outer container unit when the latter is flexed into contract with the inner container unit.

Other objects and advantages of the present invention will appear from the following description and the accompanying drawings wherein;

FIG. 1 is an isometric perspective view of one container embodying the inventive concepts, a portion of the view being in section;

FIG. 2 is an enlarged fragmentary sectional view of a portion of FIG. 1;

FIG. 3 is an enlarged fragmentary sectional view of the lower portion of FIG. 1, a portion of two containers being shown in stacked relation;

FIG. 4 is a fragmentary sectional view of an alternate embodiment of the invention;

FIG. 5 is an enlarged fragmentary sectional view of the lower portion of the embodiment shown in FIG. 4, two containers being shown in stacked relation;

FIG. 6 is a front plan view, partially in section, showing another embodiment of the invention;

FIG. 7 is a fragmentary sectional view along line 7—7 of FIG. 6;

FIG. 8 is an enlarged fragmentary sectional view of the embodiment shown in FIG. 7 showing a plurality of containers in stacked relation.

Returning now specifically to FIGS. 1–3 of the drawings, the assembled container 10 is disclosed which comprises an inner cup member 12 and an outer cup member 14. While this invention shall be discussed in terms of cup members, it will be apparent that these containers have a much wider application in use, and that the term cup is to be considered descriptive rather than limiting.

The outer cup member 14 is generally cylindrical in shape and has a closed bottom lowermost end 16. Extending upwardly therefrom is a first, relatively short, skirt wall portion 18 which circumferentially joins with the bottom surface 16. A radially outwardly extending shoulder 20 is formed adjacent the top of the skirt portion 18 and connects at its outer extremity with the generally upwardly and outwardly tapering side walls 22. At the top of the side walls 22 a rim portion or lip portion 24 is formed by curling the margin of the side walls outwardly and back upon themselves.

The inner cup member 12 is generally similar in form to the outer cup member 14 and is telescopically disposed therewithin. The member 12 has tapered side walls 28 terminating in a lip 26, and a bottom wall comprising a radial shoulder portion 30, a short skirt portion 32 and a closed end wall 34 as shown in FIG. 1. It will be noted that the diameter of the inner member 12 is slightly less than the diameter of the outer member 14. A dead air space is thus formed between the two side walls 22—28 when lip means 23 for the assembled container 10 is formed by the outward curling of the marginal extent 26 of the side walls 28 around and over the lip portion 24 of the outer member 14. The operation of rolling the rim 26 on the rim 24 of the outer container is very expeditiously accomplished by the techniques set forth in my co-pending application having Serial No. 755,908, entitled, Machine and Method For Curling the Lips of Container Articles, and filed on August 19, 1958.

The short skirt portion 32 of the inner member has a diameter less than the skirt portion 18 and accomplishes centering of the inner member relative to the outer member so that the spacing is maintained relatively between the two side walls 28—22. Further, the shoulder 30 of the inner member rests upon and is supported by the inner-directed shoulder 20 of the outer container. It will be noted that the configuration of the inner member 12 is such that end wall 34 of the inner member is preferably spaced a considerable distance from the end wall 16 of the outer member. Both the inner member 12 and the outer member 14 are adapted to be economically molded out of polyethylene or other suitable thermoplastic materials by the procedures set forth in my copending application entitled, Molding Machine, filed on September 26, 1958, and having Serial No. 763,668.

As perhaps best shown in enlarged views of FIGS. 2 and 3, the inner member 12 may be constructed of thinner stock than is the outer member 14. It should be realized that the dimensions shown in FIGS. 2 and 3 have been considerably exaggerated for purposes of disclosure herein and that it is intended, in practice, that the thicknesses of the materials used for the inner and outer members are, for example, on the order of a few thousandths of an inch. The thicker outer cup member 14 is preferably made of a thickness that is generally considered to be too "thin" by practical standards to be a useful cup, because it is too fragile, but member 12, in cooperation of the inner cup member 12, due to the reinforcing connections at the rim area 23 and also at the inter-fitting engagement of portions 32 and 30 with portions 18 and 20 provides a finished container 10 which is structurally strong enough to stand the rigorous demands of containers for use with hot liquids and for common vending machine operations. Thus, the assembled container 10, both components of which can be too fragile by themselves to provide a useful container, is structurally strong. When made as described above, the container is economically produced involving normal amounts of material used in economical production of such products.

It will be noted that the interior of the inner cup member 12 is preferably smooth and does not have crevices or interstices to trap solid particles normally suspended in beverages that are being served therein. This is important for sanitary reasons, and additionally, is esthetically pleasing to the user.

The construction of container 10 is such that the double wall thickness, together with the air space therebetween provides sufficient insulating qualities so that the user may grasp the container 10 and use it without being burned by hot materials contained in the inner member 12. Further, in the unusual event that the inner cup member 12 ruptures (due to some unforeseen flaw), the outer cup member 14, due to its peripheral continuity, would still be able to contain a beverage therein without spilling upon the user.

Another embodiment of a container 10a is shown in FIG. 4 and substantially similar parts to the one above described will be identified by similar reference numerals with the addition of the suffix "a." The essential differences of this embodiment are that the inner member 12a has a slight reverse taper to skirt 32a adjacent the shoulder means 30a and the bottom wall 34a and the outer member 14a has a plurality of rings 40 as perhaps best shown in enlarged detail section of FIG. 5. The reverse taper of the skirt 32a is useful in stacking a plurality of inner members 12a in nested relation when they are grouped together prior to assembly to the outer members 14a. This feature is most important when the thickness of the inner member is so small that the wall thickness of adjacent members 12a in a stack cannot be relied upon to maintain a spaced relation without jamming.

The skirt portion 32a and the rings 40 serve to center the inner member 12a within the outer member 14a during assembly. The rings 40 additionally serve to prevent significant heat transfer between the inner surface 28a and the outer wall surface 22a when the members 14 and 12 are made of materials so thin as to be quite flexible along the span of their side wall extents. Further, these rings rigidify the thin side wall portion of the cup.

The rings 40 are spaced closely together in the mid-portion of the side walls 22a of the outer member 14a and are formed by a plurality of reversed taper portions 42 which define generally horizontally aligned shoulders 46 having an inner surface 44 and an outer surface 48. It will be apparent that when a user grasps a semi-flexible outer member 14a in the vicinity of the rings, the portions 48 on the rings will be contacted by the user and the portions 44 will impinge upon the surface 28a of the inner container. The rings 40 may be continuous around the side wall and spaced from each other (as shown), or may be a continuous spiral (similar to a thread) or may be peripherally interrupted, the important feature being that the user's fingers will contact raised portions on the side wall 22a which is also provided with inwardly extending portions from the major plane thereof which are adapted to engage the side wall 28a of the inner member. Thus, in this construction, the fingers of the user are insulated from the interior of the container by the dimension of portion 46 on the rings 40, and by the dimension of the inner wall 28a. Also, the air trapped between the side walls provides a resilient back pressure which normally prevents a good solid heat transfer contact therebetween.

The embodiment shown in FIGS. 6–8 is still another species of the invention and similar parts are identified with similar numerals, but with the addition of the suffix "b." More particularly, the embodiment shown in FIGS. 6–8 contains a plurality of vertically aligned ribs 52, 54 and 56. As best shown in the cross sectional view of FIG. 7, the ribs provide a corrugated effect on the side walls of the uoter container and space the finger engaging surfaces 58 a considerable distance from the surface 28b of the inner side walls. It will be apparent that the various ribs may be all of one type or may be of the various types shown as suitable and desired. The major consideration again is to decrease the heat transfer to a user when the container is filled with a hot beverage.

The ribs 52, 54 and 56, in addition to the qualities above described, provide a strut action for strengthening of the very thin material employed. Thus, the ribs 52, 54 and 56 affords the utilization of very thin wall members 12b and 14b reducing even further the amount of material needed in the manufacture of the container. This is true also of the embodiment shown in FIGS. 4 and 5.

It will be noted that in each of the containers 10, 10a, and 10b, that a substantial portion of the side walls of each of the members is spaced from the other member throughout a major portion of their extents and air is trapped in the space therebetween. Also, in each of the containers shown, the wall of the inner member is considerably thinner than the wall of the outer member. While this feature of the construction is greatly desirable from the standpoint of economy, it is, of course, apparent that it is not absolutely necessary in order to be able to form a container having insulating characteristics.

It will be further noted that each of the containers 10, 10a, and 10b are provided with an inwardly directed shoulder on the outer member 14, 14a and 14b used for supporting the inner container member. However, the area of this contact between the two members is so located that it will not normally be engaged by the fingers of a person who is handling it. These aforementioned shoulders need not be continuous—they may be interrupted periodically if desired without sacrifice of insulation. Each of the containers 10, 10a and 10b has a broad rolled rim means 23, 23a and 23b which provides the sole retention of the assembled relation between the two cups which form the assembly. This rolled rim provides a very smooth surface for the user and structurally reinforces each of the members comprising the assembly. Also, in all forms of the container, the end wall of the inner member is spaced from the end wall of the outer member so that when the assembled containers are nested for delivering from a stack the individual containers will not jam and will readily separate one from the other, a most important consideration for automatic vending machines.

While I have shown and described certain embodiments of my invention, it is with full awareness that many modifications thereof are possible. Therefore, my invention is not to be restricted except as is required by the prior art and in the spirit of the pending claims.

What is claimed as the invention is:

1. A nestable double walled plastic container comprising a first hollow member of integral seamless construction having a lowermost end portion and side walls projecting upwardly and having the marginal extent thereof curved radially outwardly back upon itself to provide a circumferentially continuous rim portion, a second hollow member of integral construction disposed within said first member, said second member having a bottom wall portion and side walls projecting upwardly and terminating in a rim portion also radially outwardly curved back upon itself and adapted to overlie and engage the rim portion of said first member to provide a substantially open top, the bottom wall portion of said second member being disposed in spaced relation to the lowermost end portion of said first member, said second member being of predetermined different size relative to said first member so as to provide a space between a substantial area of the side walls of said first and second members, said first member adjacent the lowermost end portion having a predetermined diameter, said second member side walls substantially at the bottom wall being of a diameter larger than said predetermined diameter, whereby an insulating nestable container is provided, characterized in that when a plurality of like containers are disposed in nested relationship, the bottom wall of said first member is supported by said second member.

2. A nestable double walled container providing a low stacking height when a plurality of containers are nested together comprising a first hollow member having a lowermost end wall portion and side walls projecting upwardly and having a rim portion at the upper end thereof, a second hollow member disposed within said first member, said second member having a bottom wall portion and side walls projecting upwardly and terminating in a rim portion adapted to overlie and engage the rim portion of said first member to provide a substantially open top, the bottom wall portion of said second member being disposed in spaced relation to the lowermost end wall portion of said first member, said second member being of predetermined different size relative to said first member so as to provide a space between a substantial area of the side walls of said first and second members, said first member adjacent the lowermost end wall portion having a predetermined diameter, said second member side walls substantially at the bottom wall being of a diameter larger than said predetermined diameter, whereby an insulating nestable container is provided, characterized in that when a plurality of like containers are disposed in nested relationship, the bottom wall of said first member is supported by said second member.

3. A double walled plastic container of thin walled construction comprising a first hollow member of integral construction and of substantially uniform and predetermined thickness having a bottom wall portion and tapered side walls projecting upwardly and having the marginal extent thereof curved radially outwardly back upon itself to provide a circumferentially continuous rim portion, an inwardly projecting shoulder on said side walls spaced from said rim portion and said bottom wall portion and disposed adjacent the latter, a second hollow member of integral construction and of substantially uniform thickness less than said predetermined thickness of said first member and telescopically disposed within said first member, said second member having a bottom wall portion and tapered side walls projecting upwardly and terminating in a rim portion curved radially outwardly back upon itself to overlie and engage the rim portion of said first member to provide a substantially open top for said container, the bottom wall portion of said second member being disposed in spaced relation to the bottom wall of said first member and a portion of the second member being disposed for supported engagement with said inwardly directed shoulder of said first member, said second member having a size relative to said first member to provide a spaced relationship between a substantial portion of the side walls of said first and second members, the diameter of the side walls of said second member adjacent said portion in supported engagement on said inwardly directed shoulder on said first member being greater than that of the bottom wall of said first member whereby an insulated nestable container is provided.

4. The container set forth in claim 3 wherein the portion of the second member disposed in supported relation to the shoulder of said first member comprises a shoulder spaced from the bottom wall of said second member.

5. The container set forth in the claim 3 wherein the portion of said second member disposed in supported engagement with said inwardly directed shoulder of said first member is characterized as the peripheral portion of the bottom wall portion of said second member.

6. A double walled seamless plastic container comprising a first hollow member of integral thin wall construction and of predetermined thickness having a bottom wall portion and side walls projecting upwardly and outwardly with the marginal extent thereof curved outwardly and back upon itself to provide a circumferentially continuous rim portion, said side walls having a relatively large outwardly tapered axial portion and a relatively short radially inwardly offset second axial portion, said large and small axial portions being defined by a radially inwardly projecting intermediate shoulder on said side walls located intermediate said rim portion and said bottom wall portion and disposed adjacent the latter, a second hollow member disposed within said first member of integral construction and of a predetermined second thickness less than said first thickness, said second member having a bottom wall portion and uninterrupted tapered side walls projecting upwardly and terminating in a rim portion curved outwardly and back upon itself providing means to overlie and engage the rim portion of said first member to provide a substantially open top for said container, the bottom wall portion of said second member being disposed in spaced relation to the bottom wall of said first member, a portion of the second member being disposed for supported engagement with said inwardly directed shoulder of said first member, said second member having a size relative to said first member to provide a space between at least a substantial portion of the side walls of said first and second members, the diameter of the side walls of said second member adjacent said portion in supported engagement on said inwardly directed shoulder on said first member being greater than that of the bottom wall of said first member whereby an insulated nestable container is provided.

7. A double walled plastic container comprising a first hollow member of integral seamless construction having a bottom wall portion and tapered side walls projecting upwardly and having the marginal extent thereof curved back upon itself to provide a circumferentially continuous rim portion, an inwardly projecting shoulder on said side walls located intermediate said rim portion and said bottom wall portion and disposed adjacent the latter, a second hollow member of integral seamless construction disposed within said first member, said second member having a bottom wall portion and tapered side walls projecting upwardly and terminating in a rim portion curved back upon itself to overlie and engage the rim portion of said first member to provide a substantially open top for said container, the bottom wall portion of said second member being disposed in spaced relation to the bottom wall of said first member, and a portion of the second member being disposed for supported engagement with said inwardly directed shoulder of said first member, said second member having a size relative to said first member to provide a space between a major portion of the side walls of said first and second members, the diameter of the side walls of said second member adjacent said portion in supported engagement on said inwardly directed shoulder on said first member being greater than that of the bottom wall of said first member whereby an insulated nestable container is provided.

8. A nestable double walled plastic container comprising a first hollow member of integral seamless construction having a bottom wall and an outwardly flaring sidewall outwardly curved back upon itself to provide a rim portion, a second hollow member of integral seamless construction disposed within said first hollow member having a bottom wall and an outwardly flaring sidewall terminating in an outwardly curved-back-upon-itself rim portion overlying and embraceably engaging the rim portion of said first member to form therewith a joint rim portion, said joint rim portion of said first and second members having an axial dimension, said bottom walls of each of said first and second members being spaced from each other by an axial dimension greater than the dimension of said joint rim portion, the internal diameter of the sidewall of said second member substantially at its bottom wall being of a diameter greater than the outer diameter of said first member at its lowermost end whereby several containers may be nested with the bottom wall of said first member being supported by said second member in non-jamming relation, the joint rim portions of said nested containers being spaced from each other.

9. The container set forth in claim 8 wherein the sidewalls of each member have a thickness of less than 10 thousandths of an inch.

10. The container set forth in claim 8 wherein each member is substantially uniform in thickness throughout its entirety.

References Cited in the file of this patent

UNITED STATES PATENTS

| | | |
|---|---|---|
| 1,771,765 | Benson | July 29, 1930 |
| 1,955,745 | Hurley | Apr. 24, 1934 |
| 2,088,181 | Swift | July 27, 1937 |
| 2,266,828 | Sykes | Dec. 23, 1941 |
| 2,501,772 | Guard | Mar. 28, 1950 |
| 2,695,744 | Gattuso | Nov. 30, 1954 |
| 2,805,790 | Smucker | Sept. 10, 1957 |
| 2,816,697 | Amberg | Dec. 17, 1957 |
| 2,895,636 | Martin | July 21, 1959 |
| 2,899,098 | Gits | Aug. 11, 1959 |
| 2,905,350 | Edwards | Sept. 22, 1959 |

FOREIGN PATENTS

| | | |
|---|---|---|
| 819,814 | Germany | Nov. 5, 1951 |